United States Patent
Young et al.

(10) Patent No.: US 11,538,029 B2
(45) Date of Patent: Dec. 27, 2022

(54) INTEGRATED MACHINE LEARNING AND BLOCKCHAIN SYSTEMS AND METHODS FOR IMPLEMENTING AN ONLINE PLATFORM FOR ACCELERATING ONLINE TRANSACTING

(71) Applicant: Home Lending Pal, Inc., Orlando, FL (US)

(72) Inventors: Bryan Young, Orlando, FL (US); Steven Better, Durham, NC (US)

(73) Assignee: Home Lending Pal, Inc., Orlando, FL (US)

( * ) Notice: Subject to any disclaimer, the term of this patent is extended or adjusted under 35 U.S.C. 154(b) by 0 days.

(21) Appl. No.: 17/465,776

(22) Filed: Sep. 2, 2021

(65) Prior Publication Data

US 2022/0067714 A1    Mar. 3, 2022

Related U.S. Application Data

(60) Provisional application No. 63/173,610, filed on Apr. 12, 2021, provisional application No. 63/073,468, filed on Sep. 2, 2020.

(51) Int. Cl.
*G06Q 40/00* (2012.01)
*G06Q 20/38* (2012.01)
(Continued)

(52) U.S. Cl.
CPC ........... *G06Q 20/382* (2013.01); *G06K 9/628* (2013.01); *G06N 20/00* (2019.01); *G06Q 20/389* (2013.01); *G06Q 2220/00* (2013.01)

(58) Field of Classification Search
CPC .... G06Q 20/382; G06Q 20/289; G06K 9/628; G06N 20/00
See application file for complete search history.

(56) References Cited

U.S. PATENT DOCUMENTS

| | | | |
|---|---|---|---|
| 11,074,648 B1 * | 7/2021 | Duccini | H04L 9/0637 |
| 2011/0270779 A1 * | 11/2011 | Showalter | G06Q 40/02 |
| | | | 705/36 R |

(Continued)

FOREIGN PATENT DOCUMENTS

| | | | | |
|---|---|---|---|---|
| IN | 201821049456 | * | 7/2020 | G06N 20/00 |
| WO | WO-02073363 A2 | * | 9/2002 | G06Q 10/10 |

(Continued)

OTHER PUBLICATIONS

Anonymous, "The API gateway pattern versus the Direct client-to-microservice communication," Microsoft Docs, htttsp://docs.microsoft.com, Archive.org Nov. 12, 2020. (Year: 2020).*

(Continued)

*Primary Examiner* — Alexander G Kalinowski
*Assistant Examiner* — William B. Bunker
(74) *Attorney, Agent, or Firm* — Chandler Scheitlin; Padowithz Alce; Alce PLLC

(57) ABSTRACT

A system and method for implementing an online service for accelerating an online transaction includes implementing an intelligent subscriber interface; automatically creating API calls based on the plurality of distinct portions of data inputs; composing corpora of subscriber data based on a return of subscriber data by each respective API; implementing a machine learning-based classifier that: infers a first classification label for a first subset of data; and infers a second classification label for a second subset of data; computing a transaction success score that indicates a likelihood of successfully completing a prospective transaction between the subscriber and prospective transacting parties; and presenting one or more distinct product routes based on the transaction success score; creating, via a distributed ledger system, a distributed ledger record of details of the prospective transaction and cryptographic token based on a mutual (Continued)

engagement of the subscriber and a prospective transacting party.

11 Claims, 3 Drawing Sheets

(51) Int. Cl.
  *G06K 9/62* (2022.01)
  *G06N 20/00* (2019.01)

(56) References Cited

U.S. PATENT DOCUMENTS

| | | | | |
|---|---|---|---|---|
| 2014/0281487 | A1* | 9/2014 | Klausen | H04L 63/0471 |
| | | | | 713/153 |
| 2015/0235310 | A1* | 8/2015 | Rozman | G06Q 40/025 |
| | | | | 705/38 |
| 2016/0140654 | A1* | 5/2016 | Bhat | G06Q 10/06316 |
| | | | | 705/7.26 |
| 2018/0247376 | A1* | 8/2018 | Sharma | G06Q 40/08 |
| 2019/0073714 | A1* | 3/2019 | Fidanza | G06Q 20/342 |
| 2019/0333142 | A1* | 10/2019 | Thomas | G06F 16/27 |
| 2020/0265512 | A1* | 8/2020 | James | G06N 20/20 |
| 2020/0311808 | A1* | 10/2020 | Srivastava | G06Q 20/02 |
| 2020/0349641 | A1* | 11/2020 | Fidanza | H04L 63/10 |
| 2021/0217104 | A1* | 7/2021 | Phillips | G06Q 40/128 |
| 2021/0319505 | A1* | 10/2021 | Donkada | G06Q 40/025 |

FOREIGN PATENT DOCUMENTS

| | | | | |
|---|---|---|---|---|
| WO | WO-2019107577 | A1 * | 6/2019 | G06Q 10/06 |
| WO | WO-2020092426 | A2 * | 5/2020 | G06Q 10/04 |

OTHER PUBLICATIONS

Anonymous, "A Detailed Overview of AWS API Gateway," www.alexdebrie.com/posts/api-gateway-elements, 2020. (Year: 2020).*

Patel et al., "KiRTi: A Blockchain-Based Credit Recommender System for Financial Institutions," IEEE Transactions on Network Science and Engineering, vol. 8, No. 2, 2021 (Year: 2021).*

* cited by examiner

200

Implementing an Intelligent Subscriber Interface S210

Data Sourcing via a Plurality of Distinct APIs S220

Intelligently Classifying Subscriber Data S230

Identifying and Classifying Income Data Items S240

Generating Subscriber Income Models S250

Cryptographically Tokenizing a Subscriber Record via a Blockchain S260

FIGURE 2

INTEGRATED MACHINE LEARNING AND BLOCKCHAIN SYSTEMS AND METHODS FOR IMPLEMENTING AN ONLINE PLATFORM FOR ACCELERATING ONLINE TRANSACTING

CROSS-REFERENCE TO RELATED APPLICATIONS

This application claims the benefit of U.S. Provisional Application No. 63/073,468, filed 2 Sep. 2020, and U.S. Provisional Application No. 63/173,610, filed 12 Apr. 2021, which are incorporated in their entireties by this reference.

BACKGROUND

Modern transacting systems include various inefficiencies due to various information asymmetries resulting from a lack of transparency and a lack of general access to transaction-relevant information by all transacting parties. Unfortunately, these various inefficiencies increase the resources and time required for completing a successful transaction thereby increasing the cost of these types of transactions and the transaction timelines.

Thus, there is a need in the online transacting field to create improved methods and systems for intelligently accelerating transactions performed partly or fully online by improving the technical capabilities of the parties involved in an online transaction to transaction-relevant data, data-derived intelligence, and immutable assurance of data accuracy.

The embodiments of the present application described herein provide technical solutions that address, at least, the need described above.

SUMMARY OF THE INVENTION(S)

In one embodiment, a machine learning-based system for implementing an online platform for accelerating a transaction includes an ensemble of application programming interfaces (APIs) that includes a plurality of distinct APIs that source a plurality of distinct corpus of data based on API calls configured using subscriber enrollment data; an intelligent subscriber interface that is in operable communication with each of the ensemble of APIs, wherein the intelligent subscriber interface comprising a plurality of distinct sets of input objects for collecting a plurality of data inputs during an enrollment of a subscriber, the plurality of data inputs defining the subscriber enrollment data; wherein the online platform: for each of the plurality of distinct APIs, automatically creates one or more distinct API calls based on a distinct portion of the plurality of distinct portions of the data inputs that is mapped to a respective one of the plurality of distinct APIs; composes one or more corpora of subscriber data based on an execution of the one or more API calls and a return of subscriber data by each respective API of the plurality of distinct APIs; implements a machine learning-based classifier that: (i) infers a first classification label for a first subset of data of the one or more corpora of subscriber data based on extracted feature vectors from the first subset of data; and (ii) infers a second classification label for a second subset of data of the one or more corpora of subscriber data based on extracted feature vectors from the second subset of data; computes, using one or more predictive algorithms, a transaction success score that indicates a likelihood or a probability of successfully completing a prospective transaction between the subscriber and one or more prospective transacting parties based on the first subset of data and the second subset of data; and selects a product route from a plurality of distinct product routes based on the transaction success score; creates (1) a distributed ledger record of one or more details of the prospective transaction and (2) cryptographic token based on a mutual engagement of the subscriber and a prospective transacting party associated with the selected product route; and uses the cryptographic token to facilitate the prospective transaction between the subscriber and the prospective transacting party.

In one embodiment, the plurality of distinct APIs include: a financial API that, when executing a distinct one of the one or more API calls, sources financial account data of the subscriber from one or more financial account service providers; and a credit API that, when executing another distinct one of the one or more API calls, sources credit history data of the subscriber from one or more credit reporting agencies.

In one embodiment, the online platform further: computes, using a programmed income modeler, one or more income models that identify positive and negative cash flows of the subscriber based on a subset of data of the one or more corpora of subscriber data that includes income data items and expense data items of the subscriber.

In one embodiment, the distributed ledger system comprises a permissioned blockchain, and wherein the permission blockchain is defined by a plurality of nodes comprising: the online platform implementing the method; and at least one of the one or more prospective transacting parties.

In one embodiment, a machine learning-based method for implementing an online service for accelerating an online transaction includes implementing an online intelligent subscriber interface for processing a plurality of data inputs during an enrollment of a subscriber, wherein each of a plurality of distinct portions of the data inputs by the subscriber is automatically routed to one of a plurality of distinct application programming interfaces (APIs) based on a mapping between distinct input segments of the online intelligent subscriber interface and the plurality of distinct APIs; for each of the plurality of distinct APIs, automatically creating one or more distinct API calls based on a distinct portion of the plurality of distinct portions of the data inputs that is mapped to a respective one of the plurality of distinct APIs; composing one or more corpora of subscriber data based on an execution of the one or more API calls and a return of subscriber data by each respective API of the plurality of distinct APIs; implementing a machine learning-based classifier that: (i) infers a first classification label for a first subset of data of the one or more corpora of subscriber data based on extracted feature vectors from the first subset of data; and (ii) infers a second classification label for a second subset of data of the one or more corpora of subscriber data based on extracted feature vectors from the second subset of data; computing, using one or more predictive algorithms, a transaction success score that indicates a likelihood or a probability of successfully completing a prospective transaction between the subscriber and one or more prospective transacting parties based on the first subset of data and the second subset of data; and presenting one or more distinct product routes based on the transaction success score; creating, via a distributed ledger system, (1) a distributed ledger record of one or more details of the prospective transaction and (2) cryptographic token based on a mutual engagement of the subscriber and a prospective transacting party associated with a selected product route of the one or more distinct product routes; and using the cryptographic token to facilitate via the online service the prospective transaction between the subscriber and the prospective transacting party.

In one embodiment, the plurality of distinct APIs include: a financial API that, when executing a distinct one of the one or more API calls, sources financial account data of the subscriber from one or more financial account service providers; and a credit API that, when executing another distinct one of the one or more API calls, sources credit history data of the subscriber from one or more credit reporting agencies.

In one embodiment, the method includes computing, using a programmed income modeler, one or more income models that identify positive and negative cash flows of the subscriber based on a subset of data of the one or more corpora of subscriber data that includes income data items and expense data items of the subscriber.

In one embodiment, the first subset of data comprises a corpus of income data items of the subscriber, and the second subset of data comprises a corpus of expense data items of the subscriber.

In one embodiment, presenting the product route from the plurality of distinct product routes includes: evaluating the transaction success score against selection criteria for each of the plurality of distinct product routes; and identifying the product route having a highest probability of success based on the evaluation.

In one embodiment, the distributed ledger record comprises the one or more corpora of subscriber data.

In one embodiment, the distributed ledger system comprises a permissioned blockchain, and wherein the permission blockchain is defined by a plurality of nodes comprising: the online service implementing the method; and at least one of the one or more prospective transacting parties.

In one embodiment, the method includes upon mutual engagement of the subscriber and the prospective transacting party, revealing an identity of the prospective transacting party.

In one embodiment, the plurality of distinct APIs include: a property API that, when executing a distinct one of the one or more API calls, sources property data of one or more real estate properties of interest to the subscriber.

In one embodiment, the method includes implementing one or more predictive models that predict transaction closing estimate that indicates an amount of time to successfully complete the prospective transaction between the subscriber and the prospective transacting party.

BRIEF DESCRIPTION OF THE FIGURES

FIG. 2 illustrates a method 200 in accordance with one or more embodiments of the present application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. System for Accelerated Online Transacting

Figure 1:
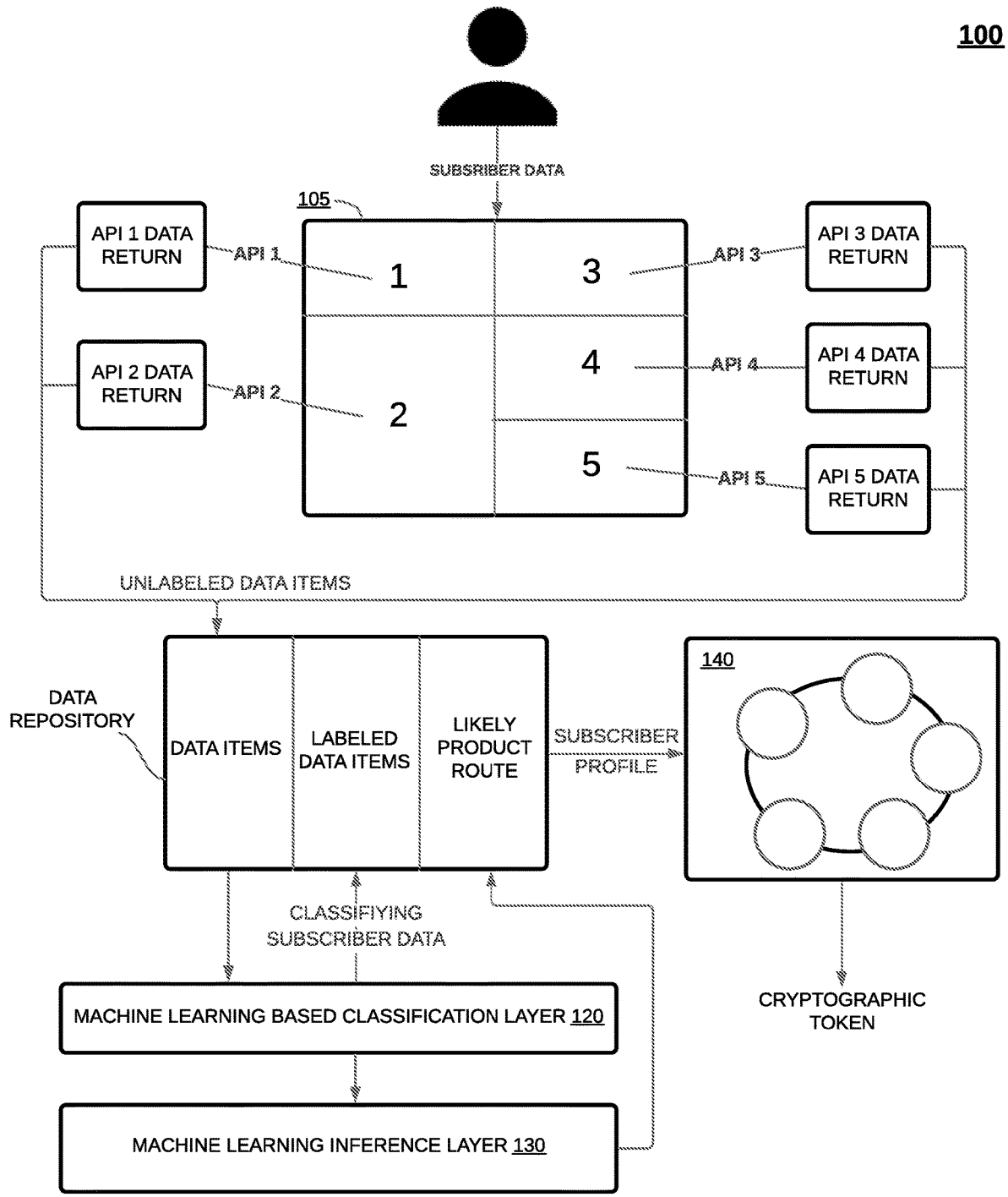
FIG. 1 illustrates a schematic representation of the system 100 in accordance with one or more embodiments of the present application.
Figure 3:
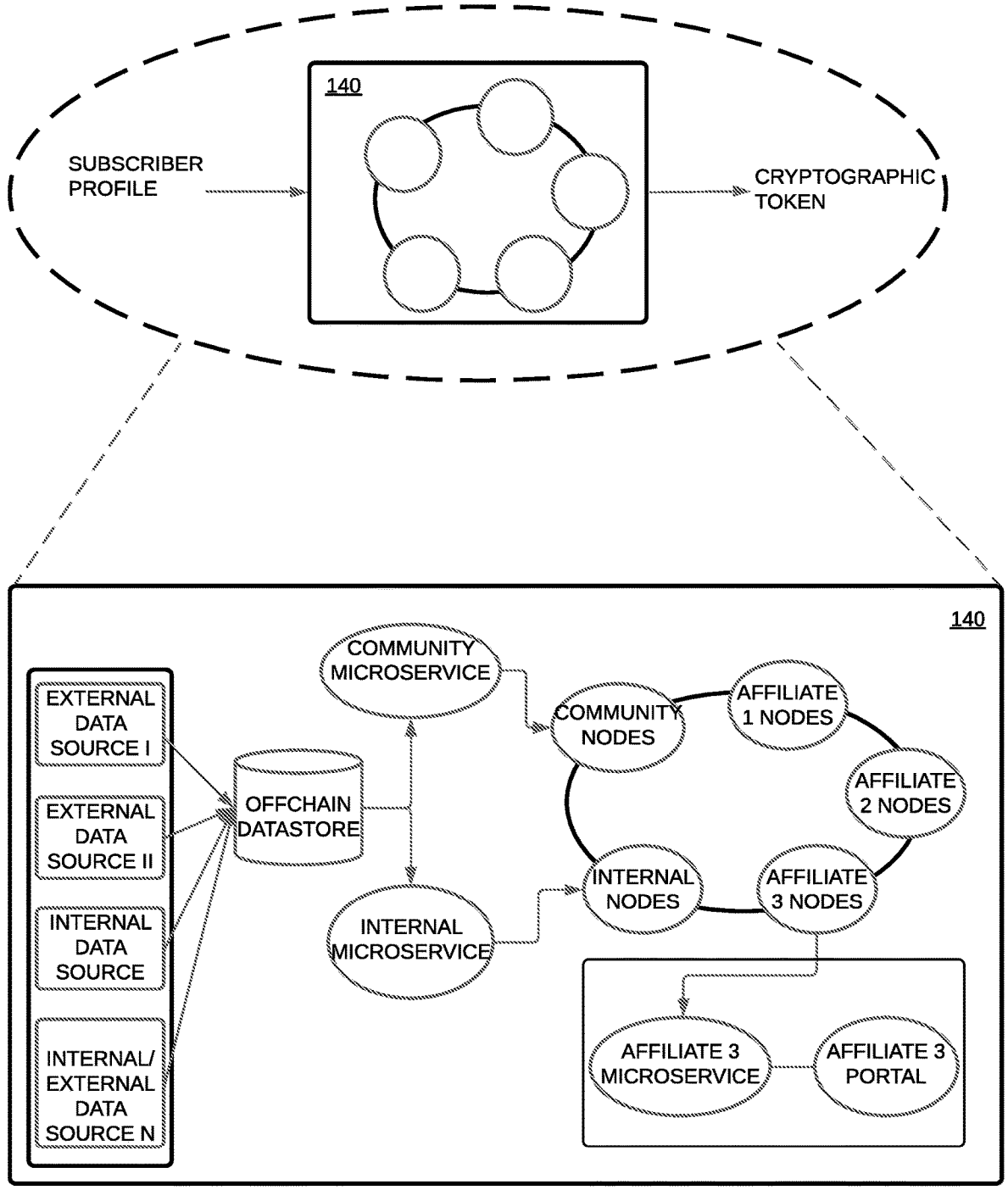
FIG. 3 illustrates a schematic of a blockchain 140 of the system 100 in accordance with one or more embodiments of the present application.

As shown in FIG. 1, a system 100 for accelerating online transacting includes an intelligent subscriber interface 105, an ensemble of APIs 110, a machine learning-based inference and classification subsystem 120, an inferential and modeling subsystem 130, and a distributed ledger system 140.

1.05 Intelligent Subscriber Interface

The client interface 105 preferably comprises an intelligent subscriber interface 105 that may be accessible to one or more subscriber via the system 100 over a network, such as the world wide web or the Internet. The intelligent subscriber interface 105 may be implemented by one or more client-servers of a distributed network of computers (e.g., the cloud) of the system 100. In one or more embodiments, the intelligent subscriber interface 105 may be in operable communication or programmatically integrated with an ensemble of distinct application programming interfaces (APIs) 110. That is, in such embodiments, the intelligent subscriber interface 105 may be in direct communication with each distinct API of the ensemble of distinct APIs no for creating API requests and/or executing API calls as well as, in some embodiments, receiving a return of data from one or more of the distinct APIs.

In one or more embodiments, the intelligent subscriber interface 105 may function to receive and/or collect input data from a user and/or subscriber in any reasonable form. For example, a subscriber may provide text input into the interface 105, may upload data and/or documents via the interface 105, may communicate input data via an (machine learning-based) digital assistant, and/or the like.

Additionally, or alternatively, the intelligent subscriber interface 105 may be specifically programmed and/or designed such that the interface 105 includes a plurality of distinct input segments along the interface 105 that may each be distinctly mapped to a distinct one of the APIs of the ensemble of APIs. In such embodiments, the input data existing or found in a distinct input segment (or a related set of input segments of the interface 105) may be packaged (i.e., made into a data packet) and automatically routed to a distinct API programmatically associated with the distinct input segment. Additionally, or alternatively, the intelligent subscriber interface 105 may be programmed to automatically transform the input data of a distinct segment into an API call format (i.e., a format for creating an API call) and subsequently routed to a corresponding or associated API for execution and/or the like.

1.10 Ensemble of APIs | Data Sourcing

The ensemble of APIs no preferably includes a plurality of distinct API sources having operable access to one or more of sources of data. In one or more embodiments, one or more systems, services, and/or modules of the system 100 may be in operable communication and/or operably integrated with the ensemble of APIs 110. In such embodiments, the ensemble of APIs no may enable a rapid access to data for facilitating one or more parts of one or more transactions between the subscriber and either one or more prospective transacting parties (or partners) or the system 100, per se.

In one or more embodiments, the ensemble of APIs may include various distinct APIs including, but not limited to, a financial API, a credit API, a property API, and/or the like. In one embodiment, the financial API may function to source financial account data directly or indirectly (e.g., via a broker) from one or more financial institutions designated by and/or associated with a subscriber. In one embodiment, the credit API may function to source credit history data directly or indirectly from one or more credit reporting agencies (e.g., Equifax, Experian, Transunion, etc.) and/or the like having credit history data relating to a subscriber. In one embodiment, the property API may function to source property data associated with one or more prospective real estate properties.

It shall be noted that the ensemble of APIs may be extensible and may be modified include one or more additional APIs that may support one or more accelerations in the one or more transactions.

Additionally, or alternatively, in one or more embodiments, the ensemble of APIs 110 may function to return data directly to one or more subsystems, modules, and/or services of the system 100. For instance, in some embodiments, the data returned by one or more APIs of the ensemble may be feed directly into one or more predictive models and/or machine learning-based classifiers and the like.

1.20 Machine Learning-Based Inference and Classification Subsystem

The machine learning-based inference and classification subsystem 120, which may sometimes be referred to herein as an "inference and classification subsystem", preferably functions to compute or predict one or more classification labels for each target data item being handled the system 100. In some embodiments, the inference and classification subsystem 120 may function to classify unlabeled data items and/or re-classify data items labeled according to an external system or foreign classification taxonomy.

Additionally, or alternatively, the inference and classification subsystem 120 may implement a single machine learning algorithm or one or more ensembles of trained machine learning models. Additionally, the inference and classification subsystem 120 may be implemented by the one or more computing servers, computer processors, distributed network of computers, and the like of the system 100.

The one or more ensembles of machine learning models of the classification and inference subsystem 120 may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), adversarial learning, and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, density-based spatial clustering of applications with noise (DBSCAN), expectation maximization, etc.), a bidirectional encoder representation form transformers (BERT) for masked language model tasks and next sentence prediction tasks and the like, variations of BERT (i.e., ULMFiT, XLM UDify, MT-DNN, SpanBERT, RoBERTa, XLNet, ERNIE, KnowBERT, VideoBERT, ERNIE BERT-wwm, MobileBERT, TinyBERT, GPT, GPT-2, GPT-3, GPT-4 (and all subsequent iterations), ELMo, content2Vec, and the like), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) may be implemented in the various systems and/or methods described herein

1.30 Inferential Modeling and Intelligence Subsystem

The inferential modeling and intelligence subsystem 130 preferably functions to create one or more financial models for a target subscriber and predict a plurality of transactional outcomes based at least on the one or more corpora of subscriber data, the collection of data sourced via the ensemble of APIs 110, and/or the one or more financial models.

In one or more embodiments, the intelligence subsystem 130 may include a plurality of distinct modeling modules that may source inputs of financial data of a subscriber, such as categorized income and categorized expense data, to create an income model that may identify sources of income or revenue of the target subscriber and create an expense model that may identify sources of income spend of the target subscriber. In some embodiments, each of the plurality of distinct modeling modules may be specifically programmed with distinct modeling algorithms wherein each variable of the modeling algorithms may be mapped to a distinct data source. In such embodiments, once the data for each variable has been sourced and/or generated, the intelligent subsystem 130 may be programmed to automatically update the variables of the modeling algorithms with data from the mapped data source and automatically generate or compute one or more models.

In one or more embodiments, the intelligence subsystem 130 may include a plurality predictive modules that may function to predict one or more transactional outcomes including, but not limited to, a likelihood of success (i.e., likelihood of approval), a likely product or service route, a likely timing or expected timing of a completion of a target transaction, and/or the like. Accordingly, in a preferred embodiment, the plurality of predictive modules includes a first module comprising a likelihood of success algorithm, a second module comprising a likely product/service routing algorithm, and a third module comprising a likely or expected timing of completion of a target transaction module. In one or more embodiments, each of the plurality of predictive modules may be specifically program with a distinct predictive algorithm having a plurality of variables. In such embodiments, each predictive module may be programmed to automatically source input values that satisfy each of the plurality of variables of a given predictive algorithm thereby enabling an automatic generation of predictions.

1.40 Distributed Ledger System | Replicated Journal | Blockchain

The distributed ledger system 140 preferably functions to create a consensus of replicated records or journals of data source on behalf of and/or from a target subscriber shared and synchronized within a decentralized peer-to-peer network while creating a cryptographic token that serves as an access mechanism to the records or journals.

In one or more embodiments, a plurality of nodes defining the peer-to-peer network of the distributed ledger system 140 preferably include permissioned nodes that may include a service implementing the system 100 and a plurality of affiliates having an interest in one or more transactions associated with one or more of the records being stored across the peer-to-peer network. It shall be recognized that the nodes operating as peers within the distributed ledger system 140 may implement any suitable consensus mechanism or protocol for accepting and/or denying entry of records across the distributed ledger system 140.

In one or more embodiments, the distributed ledger system 140 may be in operable communication with an off-chain database and/or datastore of a service implementing the system 100 and source data for creating records within the distributed ledger system 140. In such embodiments, one or more distinct services including third-party services may function to store data into the off-chain data store and the distributed ledger system 140 may function to source data for creating replicated records from the off-chain data store.

In some embodiments, the distributed ledger system 140 may be in direct operable communication with one or more distinct services having data. In such embodiments, the one or more distinct services may directly provide data records for replication and recordation across the plurality of distinct storage nodes of the distributed ledger system.

In a preferred embodiment, the distributed ledger system 140 comprises a blockchain.

2. Method for Accelerated Online Transacting

As shown in FIG. 2, the method 200 includes implementing an intelligent subscriber interface S210, data sourcing via an ensemble of APIs S220, intelligently classifying subscriber data S230, identifying and classifying income data items S240, generating subscriber income models and predictions S250, and creating a distributed ledger record and cryptographically tokenizing the record S260.

2.10 Subscriber Enrollment

S210, which includes implementing an intelligent subscriber interface, may function to implement a client interface (e.g., user interface via a computing device or the like) that enables a subscriber to a service implementing the method 200 and/or the system 100 to receive subscriber-specific inputs and/or data (e.g., subscriber enrollment data) that may enable an enrollment to the service. In such embodiments, the client interface may be in operable communication with and/or may be deployed by one or more client-servers of the service and may be accessible to a subscriber via any suitable computing device (e.g., mobile device, smart phone, laptop, etc.). In one or more embodiments, S210 may function to build a subscriber transacting profile based at least on the subscriber enrollment data sourced via the client interface.

In one or more embodiments, the client interface comprises an intelligent enrollment interface that may include a plurality of interface objects for collecting and/or identifying subscriber data. In some embodiments, the intelligent enrollment interface may include one or more distinct interface objects for receiving subscriber data relating to one or more of subscriber contact information (e.g., email, phone contact, etc.), subscriber financial account information (e.g., bank/credit account credentials), subscriber personally identifying information (e.g., dob, ssn, address, etc.), and/or the like.

In one or more embodiments, S210 may function to digitally map or associate the one or more distinct interface objects and the subscriber data provided therein subscriber to one or more distinct APIs, such that upon receipt at a distinct API, the distinct API may be initialized and an API request or call may be automatically created using the subscriber data. That is, in one or more embodiments, the intelligent enrollment interface may be programmed to interface and/or communicate directly with an ensemble of distinct APIs. Accordingly, in some embodiments, the distinct segments or partitions of the intelligent enrollment interface that may include one or more interface objects may be encoded with instructions and/or be specifically programmed to automatically route any obtained input data to one or more distinct data handling servers or computers, such as the one or more distinct APIs. For instance, input into a first segment of the intelligent enrollment interface may be programmed or designed to route the collected input data to a first distinct API, a second segment of the interface may be programmed to route input data to a second distinct API, a third segment of the interface may be programmed to route input data to a third distinct API, and the like. Therefore, data routing instructions and/or data routing parameters may be programmatically embedded into the intelligent enrollment interface thereby alleviating a requirement for an intermediary data store or the like for collecting the data provided via the intelligent enrollment interface and subsequently, routing to the ensemble of distinct APIs. In this way, a technical processing time between an identification and/or collection of subscriber enrollment data and the implementation of the one or more distinct APIs may be reduced for accelerating the one or more downstream and/or parallel processes of the method 200.

Additionally, or alternatively, in some embodiments, implementing the intelligent enrollment interface may include presenting a collection of prompts (e.g., surveys) for identifying or collecting additional data and/or permissions from a subscriber that may enable access to one or more third-party sources having subscriber data and/or for informing a routing of the subscriber data to one or more product-specific transaction pipelines. For example, a service implementing the method 200 and/or the system 100 may have access to a plurality of distinct products and/or product-specific transaction pipelines. In such example, response data collected and/or identified based on the presentation of the collection of prompts may inform a selection of one or more of the plurality of product-specific transaction pipelines for handling the subscriber data and enabling a prospective transaction.

2.20 Ensemble of APIs+Data Sourcing

S220, which includes implementing a plurality of distinct APIs, may function to implement an ensemble of distinct APIs that may operate to automatically source subscriber data, transaction-relevant data, and/or the like based at least on the subscriber enrollment data.

In one or more embodiments, the subscriber data that may be sourced via the ensemble of APIs preferably relate to data relating to and/or belonging to the subscriber in some manner and that is obtained from one or more third-party data sources. In one example, the plurality of distinct APIs may include, but should not be limited to, a financial API, a credit API, a property API, and the like. In this example, the financial API may function to source subscriber data that include financial account data (e.g., checking, savings, credit, etc.), the credit API may function to source subscriber data that include subscriber credit history data (e.g., credit score, credit account history, etc.), and the property API may function to source property data relating to one or more target properties in which a subscriber has shown interest in acquiring or the like. Additionally, or alternatively, the subscriber data may include data relating to one or more targets or subjects of a prospective transaction, such as one or more properties or the like.

Subscriber Enrollment Interface Direct Mapping to Ensemble of APIs

In a first implementation, one or more (or a subset of) input objects of the intelligent enrollment interface may be mapped directly or indirectly to one API of the plurality of distinct APIs such that a receipt of any piece of data or input data by a subscriber or the like into the one or more input objects causes an automatic transmission of the input data to a distinct one of the plurality of APIs. That is, in one or more embodiments, the method 200 may function to pre-configure an automated input routing scheme between the intelligent enrollment interface and the plurality of distinct APIs that technically accelerates a sourcing of additional data for building a robust subscriber data profile for one or more downstream processes of a service or system implementing the method 200.

Auto Creation of API Calls

In the first implementation, S210 and/or S220 via the intelligent enrollment interface may function to automatically create an API call to at least one of the plurality of distinct APIs based on subscriber data received or identified by one or more segments of the intelligent enrollment interface. That is, in some embodiments, subscriber data received or identified by the intelligent enrollment interface may function to automatically trigger or automatically cause a transformation of the data to or a creation of one or more API calls that may be consumed and/or executed by one or more of the plurality of distinct APIs.

API Arbiter

In a second implementation, S220 may additionally or alternatively function to implement and an API arbiter that preferably functions to collect or receive subscriber enrollment data via the intelligent enrollment interface and interface with the ensemble of APIs based on the subscriber enrollment data. In this second implementation, the API arbiter may be specifically encoded with subscriber enrollment data handling instructions and/or programmed to obtain and/or identify the subscriber enrollment data provided via the intelligent enrollment interface and automatically create and route one or more distinct API calls to the plurality of distinct APIs defining the ensemble of APIs. That is, the API arbiter may include a system and/or module that may be configured and/or programmed with the API definitions and protocols of each distinct API of the ensemble of APIs and may function as an intermediary between the intelligent enrollment interface and the ensemble of distinct APIs for intelligently handling and routing subscriber enrollment data therebetween.

In one or more embodiments, upon receipt of subscriber enrollment data, the API arbiter may function to partition and/or arrange (bucket) the subscriber enrollment data into a plurality of distinct portions of (subscriber enrollment) data for creating distinct API calls. In such embodiments, the API arbiter may function to automatically create at least one distinct API call based on the attributes of each of the plurality of distinct portions of data. For example, if a partition of subscriber data includes subscriber credentials for a financial account, S220 may function to implement the API arbiter automatically create a financial API call according to the API definitions and protocols of the financial API based on the subscriber credentials. In another example, if a second partition of subscriber data includes subscriber permissions for accessing subscriber credit history, S220 may function to implement the API arbiter to automatically create a credit API call according to the API definitions and protocols of the credit API based on the subscriber permissions.

Accordingly, in response to or based on a creation of the plurality of distinct API calls, S220 may function to implement the API arbiter to route each of the plurality of distinct API calls to its corresponding API destination associated with one or more of the ensemble of distinct APIs.

It shall be noted that the API arbiter may be integrated with any other suitable system or module described herein including, but not limited to, the intelligent enrollment interface and/or the like.

Additionally, or alternatively, in response to the plurality of API calls from either the first or the second implementation and the like, the ensemble of distinct APIs may function to return one or more corpora of subscriber data and/or transactional data.

2.30 Subscriber Data Classification

S230 which includes intelligently classifying subscriber data, may function to implement one or more machine learning-based classifiers and/or automated data categorization techniques for classifying data items of the one or more corpora of subscriber data.

Hierarchical Classification of Subscriber Financial Data

In one or more embodiments, the one or more corpora of subscriber data may include a volume of data of various kinds and types. In one embodiment, the one or more corpora of subscriber data may include financial account data, such as a plurality of expense transaction items and the like, sourced via a financial API or the like. In this embodiment, each of the plurality of expense transactions may have been previously categorized with distinct and/or foreign category labels identifying a category of expense according to an external system or service. While, in some embodiments, the identified category of expense may be useful for identifying a granular use or spend of financial resources of a given subscriber, these granular expense type categorizations may be less informative of a global financial health and spending habits of the subscriber.

Accordingly, S230 may function to implement one or more machine learning-based classifiers that may function to classify each expense data item or transaction to a classification tier of or a subsection of a classification tier of a hierarchical classification structure for expenses or the like. In one or more embodiments, the hierarchical classification structure may include a plurality of distinct classification tiers in which each distinct classification tier may function to encapsulate a group of distinct expense data items or transactions. That is, in such embodiment, each classification tier may be a broad or coarse category (classification) that encompasses a plurality of granular or sub-categories of expenses. In some embodiments, the hierarchical classification structure comprises multiple broad classification tiers, such as discretionary expense, living expense, and recurring (e.g., monthly) debt obligation into which the one or more machine learning-based classifier may function to classify each expense data item therein.

In one or more embodiments, S230 may function to implement an ensemble of trained machine learning algorithms for classifying data items of the one or more corpora of subscriber data. In such embodiments, the ensemble of trained machine learning algorithms may include a text clustering algorithm and a text classifier. Accordingly, further in such embodiments, the expense data items preferably include a string of text describing an expense event or transaction. In one or more embodiments, S230 may function to implement the ensemble of trained machine learning algorithms by first applying the text clustering algorithm to a feature vector of each data item or expense data item for predicting or attributing each expense data item to a cluster of expense data items. Subsequently, S230 implementing a hierarchical text classifier may function to classify each expense data item to one classification tier of the hierarchical classification structure based on its associated cluster data. In such embodiments, the hierarchical text classifier may include a multi-task classifier trained to predict multiple distinct classification labels for a given model input. For instance, if a hierarchical classification structure includes three distinct tiers, the hierarchical text classifier may be trained to output one of the three classification tiers as a classification label for a given model input.

It shall be known that S230 may function to implement any suitable and specifically configured feature extractor for creating a feature vector for each expense data item. For instance, in one embodiment, a feature vector computation may be informed by at least an embedding value for a text string description of a target expense transaction together with an embedding value for an associated expense classification label.

It shall be recognized that the data item classification of S230 may implemented for multiple purposes including, but not limited to, for categorizing each data item of subscriber data to native classifications and for creating one or more training data corpora that may include labeled data samples. In one or more embodiments, the one or more training data corpora may be implemented for training or re-training one or more machine learning models implemented by the system 100 and/or the method 200.

2.40 Machine Learning-Based Income Classification

S240, which includes identifying and classifying income data items, may function to implement one or more trained machine learning models that classify financial data items into at least one of a plurality of categories of subscriber income. In one or more embodiments, S240 may function to partition (unlabeled) income data items from subscriber data including API-sourced financial data and/or subscriber-provided financial data, which may include a combination of income data items and expense data items. In such embodiments, S240 may function to define a corpus of financial data items for a given subscriber based on a combination of financial data items from multiple sources including, but not limited to, API-sourced financial data and subscriber-provided financial data (e.g., financial data provided via the intelligent enrollment interface or the like).

It shall be recognized that income data items, as referred to herein, preferably relate to items of data, such as transactions, that identify money received resulting from work or investments by a target subscriber.

Income Data Extraction and Classification

In one or more embodiments, one or more parts of the financial data obtained on the behalf of and/or provided by a subscriber may include one or more forms or electronic documents that include one or more inputs of income data items. In such embodiments, S240 may function to scan or read, using optical character recognition (OCR) of the like, the one or more forms or electronic documents to identify likely income data items. In one example, a subscriber may upload or provide access to an electronic copy of a tax return document in the form of a PDF or the like. In this example, S240 may function to scan the tax return document using an OCR technique and extract from the tax return document data items likely relating to or describing income of the target subscriber. In response to scanning and/or extracting income data items from one or more forms or electronic documents of a target subscriber, S240 may function to pass or otherwise store the extracted income data items with the financial data items of the subscriber. In one alternative embodiment, the extracted income data items from the one or more forms or documents may be stored in an income data item-specific corpus.

Additionally, or alternatively, in one or more embodiments, S240 may function to implement a trained supervised machine learning classification model that classifies unlabeled or differently-labeled data items of financial data into one or more categories of subscriber income. In one or more embodiments, classifying the financial data items may include implementing a feature extractor that extracts a feature set for each financial data item and may convert the feature set for each financial data item into a feature vector (i.e., a numerical representation of the financial data item). In such embodiments, the feature vector for a target financial data item may be fed as input into the trained supervised machine learning model and in response to the vector input, the trained supervised machine learning model may compute or infer a likely classification of the financial data item. In one example, the trained supervised machine learning model may function to predict a classification label of "income" or "not income" or a similar binary prediction that either confirms a target classification or invalidates the target classification. Additionally, or alternatively, the trained supervised machine learning model may additionally compute a likelihood, confidence value, and/or a probability value for each predicted classification label indicating a confidence or probability that the classification label is accurate.

2.50 Income Modeling and Prediction Models

S250, which includes generating subscriber income models and predictions, may function to generate one or more income models based on one or more of a corpus of labeled income data items and a corpus of labeled expense data items. In one or more embodiments, S250 may function to implement an income modeling algorithm that sources, as inputs, one or more income data items and one or more expense data items based on the respective classification labels associated with each of the income data items and expense data items. In such embodiments, S250 may function to perform various computations with the income data items and expense data items depending on their respective classification labels. Accordingly, in one or more embodiments, S250 may function to compute one or more models of qualified income, recurring income, gross income, net income, and/or the like for a given subscriber.

Transaction Success Score

In some embodiments, S250 may function to generate, using one or more predictive algorithms, a prediction of a likelihood or a probability of success completing one or more prospective transaction involving the subscriber and one or more prospective transacting parties. In one or more embodiments, the prediction of the probability of success may sometimes be referred to herein as a "transaction success score". In one embodiment, a transaction success score may be computed for each pairwise between a target subscriber and one of a plurality of distinct transacting parties thereby indicating the probability of success between a prospective transaction between the subscriber and each potential transacting partner.

Additionally, or alternatively, the one or more predictive algorithms for computing a transaction success score may include a plurality of distinct variables which may take into account a credit history of a target subscriber, recurring income, financial savings, and qualified collateral. In one or more embodiments, a value for each of these variables may be computed based on subscriber data (once classified) and/or subscriber enrollment data.

Additionally, or alternatively, in some embodiments, S250 may function to implement one or more simulators that may function to vary and/or update one or more the generated income models and/or transaction success scores of a target subscriber based on proposed changes to one or more variables of the income modeling algorithm and/or the one or more predictive algorithms for estimating the likelihood of success of one or more prospective transactions.

Predictions: Likely Product Routing and Time to Completion

Additionally, or alternatively, S250 may function to predict one or more likely product routings and a likely timing of a completion of a prospective transaction. In one embodiment, S250 may function to select and propose likely product routes based on features of a subscriber's transaction profile together with product one or more overlays of a prospective transacting party's that include transacting parameters and/or constraints for a given product route. In such embodiment, S250 may function to select and/or propose one or more product routes of a plurality of distinct product routes based on the transaction success score and preserving or improving one or more income models of a given subscriber.

Additionally, or alternatively, S250 may function to predict a likely time for successfully completing a prospective transaction, preferably after a confirmation of a proposed product route. In one or more embodiments, S250 may function to compute the likely time of completion based at least on a transacting profile of the subscriber and historical transacting periods for a given product route and/or a prospective transacting partner.

2.60 Routing and Subscriber Transaction Profile Tokenization

S260, which includes creating a distributed ledger record of an active transaction involving the subscriber, may function to create one or more records via an online distributed ledger of a prospective transaction involving the subscriber and cryptographically tokenizing the one or more records of the distributed ledger.

In one or more embodiments, S260 may function to trigger or cause an automatic creation of a cryptographic token for a given transaction involving a subscriber based at least on a selection of a proposed product route, such as a loan product and/or lending party. In such embodiments, the selection of a given product route or of a prospective transacting partner may function to automatically create a request to a distributed ledger system, such as a blockchain, to record one or more details of a prospective transaction involving the subscriber and the proposed transacting partner. Preferably, the request includes details of the prospective transaction involving the subscriber and the prospective transacting partner. In response to receiving the request, the details of the prospective transaction including a copy of a transaction profile of the subscriber may be recorded and a cryptographic token may be generated that enables access to the details of the prospective transaction via the distributed ledger system.

In one variant, a trigger or cause of the automatic generation of the request to the distributed ledger system may be an acceptance by the prospective transacting partner to engage in the prospective transaction with the subscriber.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A machine learning-based system for implementing an online platform for accelerating computerized processing of a financial transaction between a subscriber to the online platform and at least one of a plurality of financial transacting entities associated with the online platform, while maintaining confidential personally identifying information of the subscriber until loan approval, the system comprising:

an ensemble of application programming interfaces (APIs) that includes a plurality of distinct APIs that source a plurality of distinct corpus of data based on API calls configured using subscriber enrollment data;

an intelligent subscriber enrollment interface that is in operable communication with each of the plurality of distinct APIs, wherein the intelligent subscriber enrollment interface comprises a plurality of distinct sets of interface objects for collecting a plurality of data inputs into the intelligent subscriber enrollment interface by the subscriber during an enrollment of the subscriber, the plurality of data inputs defining the subscriber enrollment data;

wherein:
(a) each distinct set of interface objects of the plurality of distinct sets of interface objects of the intelligent subscriber enrollment interface is encoded to a distinct one of the plurality of distinct APIs, wherein the plurality of distinct sets of interface objects comprise subscriber contact information, subscriber financial account information, and subscriber personally identifying information, wherein the plurality of data inputs are configured to permit the online platform to build a subscriber financial profile; and
(b) the encoding comprising computer instructions that, when executed, automatically routes distinct input data obtained at each distinct set of interface objects of the intelligent subscriber enrollment interface to the distinct one of the plurality of distinct APIs, wherein the routing is based on a mapping between distinct input segments of the intelligent subscriber enrollment interface and the plurality of APIs;

wherein the online platform:
in response to identifying inputs of data to the distinct sets of interface objects of the intelligent subscriber enrollment interface, automatically transforms, using API definitions and API protocols associated with each of the plurality of distinct APIs, the distinct input data obtained at each distinct set of interface objects of the intelligent subscriber enrollment interface to one or more distinct API calls for the encoded distinct one of the plurality of distinct APIs, wherein the one or more distinct API calls source financial account data of the subscriber from one or more financial account service providers including at least credit history data of the subscriber and income and expense data of the subscriber;

composes one or more corpora of subscriber financial profile data based on an execution of the one or more distinct API calls and a return of subscriber data by each respective API of the plurality of distinct APIs;

computes, using one or more machine learning-based simulation algorithms, (a) a first transaction simulation score between the subscriber and a first prospective transacting entity based on simulated transacting parameters of the first prospective transacting entity and (b) a second transaction simulation score between the subscriber data and a second prospective transacting entity based on simulated transacting parameters of the second prospective transacting entity, wherein:

the first transaction simulation score and the second transaction simulation score simulate the likely timing of completing a financial transaction with the subscriber and the likelihood or a probability of a respective transacting entity successfully approving a prospective transaction prior to the respective transacting entity receiving personally identifying information of the subscriber contained within the subscriber financial profile; and in response to selecting, by the subscriber, one of the first prospective transacting entity and the second prospective transacting entity for completing the financial transaction, automatically creates, via a distributed ledger system, (1) a cryptographically-secured distributed ledger record that stores a copy of the subscriber financial profile and (2) cryptographic token encoded to the cryptographically-secured distributed ledger record that is passed to the selected one of the first prospective transacting entity and the second prospective transacting entity, wherein the distributed ledger system comprises a permissioned blockchain defined by a plurality of computerized nodes comprising the online platform implementing the system, the first prospective transacting entity, and the second prospective transacting entity, wherein the distributed ledger system is configured to create a consensus of replicated records associated with the financial transaction involving the subscriber which are shared and synchronized within a decentralized peer-to-peer network of a plurality of transacting entities, wherein the cryptographic token serves as an access mechanism to the consensus of replicated records, wherein the subscriber financial profile is stored in an off-chain datastore which is in operable electronic communication with the distributed ledger system to permit the creation of the cryptographically-secured distributed ledger record of the transaction, wherein the cryptographic token enables an instantiation of a new prospective online financial transaction between the subscriber and the selected one of the first prospective transacting entity and the second prospective transacting entity, wherein the instantiation comprises a request to automatically record on the distributed ledger system a copy of the subscriber financial profile, including the personally identifying information, and details of the prospective transaction involving the subscriber and the selected one of the first prospective transacting entity and the second prospective transacting entity; and wherein an acceptance by the selected one of the first prospective transacting entity and the second prospective transacting entity to engage in the new prospective online financial transaction causes the selected one of the first prospective transacting entity and the second prospective transacting entity to receive the cryptographic token, thereby revealing the personally identifying information of the subscriber to the selected one of the first prospective transacting entity and the second prospective transacting entity.

2. A system according to claim 1, wherein the plurality of distinct APIs include:
a financial API that, when executing a distinct one of the one or more API calls, sources the financial account data of the subscriber from the one or more financial account service providers; and a credit API that, when executing another distinct one of the one or more API calls, sources the credit history data of the subscriber from one or more credit reporting agencies.

3. A system according to claim 1, wherein the online platform further:
computes, using a programmed income modeler, one or more income models that identify positive and negative cash flows of the subscriber based on a subset of data of the one or more corpora of subscriber financial profile data.

4. A method for implementing an online service for accelerating computerized processing of an online financial transaction between a subscriber to the online service and at least one of a plurality of financial transacting entities who are associated with the online service, while maintaining confidential personally identifying information of the subscriber until loan approval, the method comprising:
implementing an online intelligent subscriber enrollment interface that is in operable communication with each of a plurality of distinct application programming interfaces (APIs), wherein the online intelligent subscriber enrollment interface processes a plurality of data inputs collected or identified by a plurality of distinct sets of interface objects and input into the online intelligent subscriber enrollment interface during an enrollment of the subscriber;
wherein:
(a) each distinct set of input interface objects of the plurality of distinct sets of interface objects of the online intelligent subscriber enrollment interface is encoded to a distinct one of the plurality of distinct APIs, wherein the plurality of distinct set of interface objects comprise subscriber contact information, subscriber financial account information, and subscriber personally identifying information, wherein the plurality of data inputs are configured to permit the online service to build a subscriber financial profile,
(b) the encoding comprising computer instructions that, when executed, automatically routes distinct input data obtained at each distinct set of interface objects of the online intelligent subscriber enrollment interface to the distinct one of the plurality of distinct APIs, wherein the routing is based on a mapping between distinct input segments of the online intelligent subscriber enrollment interface and the plurality of distinct APIs;
in response to identifying inputs of data to the distinct sets of interface objects of the online intelligent subscriber enrollment interface, automatically transforming by one or more computers, using API definitions and API protocols associated with each of the plurality of distinct APIs, the distinct input data obtained at each distinct set of interface objects of the online intelligent subscriber enrollment interface to one or more distinct API calls for the encoded distinct one of the plurality of distinct APIs, wherein the one or more distinct API calls source financial account data of the subscriber from one or more financial account service providers including at least credit history data of the subscriber and income and expense data of the subscriber;
composing one or more corpora of subscriber financial profile data based on an execution of the one or more distinct API calls for each of the plurality of distinct APIs and a return of subscriber data by each respective API of the plurality of distinct APIs;
computing, using one or more machine learning-based simulation algorithms, (a) a first transaction simulation score between the subscriber data and a first prospective transaction entity based on simulated transacting parameters of the first prospective transacting entity and (b) a second transaction simulation score between the subscriber data and a second prospective transacting entity, wherein:
the first transaction simulation score and the second transaction simulation score simulate the likely timing of completing a financial transaction with the subscriber and the likelihood or a probability of a respective transacting entity successfully approving a prospective transaction prior to the respective transacting party receiving personally identifying information of the subscriber contained with the subscriber financial profile;
in response to selecting, by the subscriber, one of the first prospective transacting entity and the second prospective transacting entity for completing the financial transaction, automatically creating, via a distributed ledger system, (1) a cryptographically-secured distributed ledger record that stores a copy of the subscriber financial profile and (2) cryptographic token encoded to the cryptographically-secured distributed ledger record that is passed to the selected one of the first prospective transacting entity and the second prospective transacting entity for completing the financial transaction, wherein the distributed ledger system comprises a permissioned blockchain defined by a plurality of computerized nodes comprising an online platform implementing the online service, the first prospective transacting entity, and the second prospective transacting entity, wherein the distributed ledger system is configured to create a consensus of replicated records associated with the financial transaction involving the subscriber which are shared and synchronized within a decentralized peer-to-peer network of the plurality of financial transacting entities, wherein the subscriber financial profile is stored in an off-chain datastore which is in operable electronic communication with the distributed ledger system to permit the creation of the record of the transaction,
wherein the cryptographic token enables an instantiation of a new prospective online financial transaction between the subscriber and the selected one of the first prospective transacting entity and the second prospective transacting entity, wherein the instantiation comprises a request to automatically record on the distributed ledger system a copy of the subscriber financial profile, including the personally identifying information, and details of the new prospective online financial transaction involving the subscriber and the selected one of the first prospective transacting entity and the second prospective transacting entity; and
wherein an acceptance by the selected one of the first prospective transacting entity and the second prospective transacting entity to engage in the prospective financial transaction causes the selected transacting entity to receive the cryptographic token, thereby revealing the personally identifying information of the subscriber to the selected one of the first prospective transacting entity and the second prospective transacting entity.

5. The method according to claim 4, wherein
the plurality of distinct APIs include:
   a financial API that, when executing a distinct one of the one or more API calls, sources the financial account data of the subscriber from the one or more financial account service providers; and
   a credit API that, when executing another distinct one of the one or more API calls, sources the credit history data of the subscriber from one or more credit reporting agencies.

6. The method according to claim 4, further comprising:
computing, using a programmed income modeler, one or more income models that identify positive and negative cash flows of the subscriber based on a subset of data of the one or more corpora of subscriber financial profile data.

7. The method according to claim 4, wherein
the first subset of data comprises a corpus of income data items of the subscriber, and
the second subset of data comprises a corpus of expense data items of the subscriber.

8. The method according to claim 4, wherein
the distributed ledger record comprises the one or more corpora of subscriber financial profile data.

9. The method according to claim 4, wherein
the plurality of distinct APIs include:
   a property API that, when executing a distinct one of the one or more API calls, sources property data of one or more real estate properties of interest to the subscriber.

10. The method according to claim 4, further comprising:
implementing one or more predictive models that predict transaction closing estimate that indicates an amount of time to successfully complete the prospective transaction between the subscriber and the prospective transacting party.

11. A machine learning-based system for implementing an online platform for accelerating computerized processing of an online financial transaction between a subscriber to the online platform and at least one of a plurality of financial transacting entities who are associated with the online platform, while maintaining confidential the personally identifying information of the subscriber until loan approval, the system comprising:
an ensemble of application programming interfaces (APIs) that includes a plurality of distinct APIs that source a plurality of distinct corpus of data based on API calls configured using subscriber enrollment data;
an intelligent subscriber enrollment interface that is in operable communication with each of the plurality of distinct APIs, wherein the intelligent subscriber enrollment interface comprising a plurality of distinct sets of interface objects for collecting a plurality of data inputs during an enrollment of a subscriber, the plurality of data inputs defining the subscriber enrollment data;
wherein:
   (a) each distinct set of interface objects of the plurality of distinct sets of interface objects of the intelligent subscriber enrollment interface is encoded to a distinct one of the plurality of distinct APIs, wherein the plurality of distinct set of interface objects comprises subscriber contact information, subscriber financial account information, and subscriber personally identifying information, wherein the plurality of data inputs are configured to permit the online platform to build a subscriber financial profile,
   (b) the encoding comprising computer instructions that, when executed, automatically routes distinct input data obtained at each distinct set of interface objects of the intelligent subscriber enrollment interface to the distinct one of the plurality of distinct APIs, wherein the routing is based on a mapping between distinct input segments of the intelligent subscriber enrollment interface and the plurality of distinct APIs;
wherein the online platform:
   implements an API arbiter that is communicably arranged between the intelligence subscriber enrollment interface and the plurality of distinct APIs,
   wherein the API arbiter is (1) programmed with subscriber enrollment data handling instructions and (2) configured with API definitions and protocols of each of the plurality of distinct APIs that, when executed, causes the API arbiter to:
      identify input data obtained at each distinct set of interface objects of the intelligent subscriber enrollment interface,
      partition the subscriber data to a plurality of distinct portions based on the distinct sets of interface objects, and
      automatically transforms, using API definitions and API protocols associated with each of the plurality of distinct APIs, the distinct input data obtained at each distinct set of interface objects of the intelligent subscriber enrollment interface to one or more distinct API calls for the encoded distinct one of the plurality of distinct APIs, wherein the one or more distinct API calls source financial account data of the subscriber from one or more financial account service providers including at least credit history data of the subscriber and income and expense data of the subscriber;
   composes one or more corpora of subscriber financial profile data based on an execution of the one or more distinct API calls and a return of subscriber data by each respective API of the plurality of distinct APIs;
   computes, using one or more machine learning-based simulation algorithms, (a) a first transaction simulation score between the subscriber and a first prospective transacting entity based on simulated transacting parameters of the first prospective transacting entity and (b) a second transaction simulation score between the subscriber data and a second prospective transacting entity based on simulated transacting parameters of the second prospective transacting entity, wherein:
   the first transaction simulation score and the second transaction simulation score simulate the likely timing of completing a financial transaction with the subscriber and the likelihood or a probability of a respective transacting entity successfully approving a prospective transaction prior to the respective transacting entity receiving personally identifiable information of the subscriber contained within the subscriber financial profile; and
   in response to selecting, by the subscriber, one of the first prospective transacting entity or the second prospective transacting entity for completing the financial transaction, automatically creates, via a distributed ledger system, (1) a cryptographically-secured distributed ledger record that stores a copy of the subscriber financial profile and (2) cryptographic token encoded to the cryptographically-secured distributed ledger record that is passed to the selected one of the first prospective transacting entity or the second prospective transacting entity for completing the financial transaction, wherein the distributed ledger system comprises a permissioned blockchain defined by a plurality of computerized nodes comprising the online platform implementing the system, the first prospective transacting entity, and the second prospective transacting entity, wherein the distributed ledger system is configured to create a consensus of replicated records associated with the financial transaction involving the subscriber which are shared and synchronized within a decentralized peer-to-peer network of a plurality of transacting entities, wherein the cryptographic token serves as an access mechanism to the consensus of replicated records, wherein the subscriber financial profile is stored in an off-chain datastore which is in operable electronic communication with the distributed ledger system to permit the creation of the record of the transaction, wherein the cryptographic token enables an instantiation of a new prospective online financial transaction between the subscriber and the selected one of the first prospective transacting entity and the second prospective transacting entity, wherein the instantiation comprises a request to automatically record on the distributed ledger system a copy of the subscriber financial profile, including the personally identifying information, and the details of the prospective transaction involving the subscriber and the selected one of the first prospective transacting entity and the second prospective transacting entity; and wherein the acceptance by the selected one of the first prospective transacting entity and the second prospective transacting entity to engage in the prospective financial transaction causes the selected transacting entity to receive the cryptographic token, thereby revealing the personally identifying information of the subscriber to the selected one of the first prospective transacting entity and the second prospective transacting entity.

* * * * *